Sept. 25, 1923.
S. W. WIGNER
SIGNAL FOR AUTOMOBILES
Filed Feb. 6, 1922
1,468,684
3 Sheets-Sheet 3
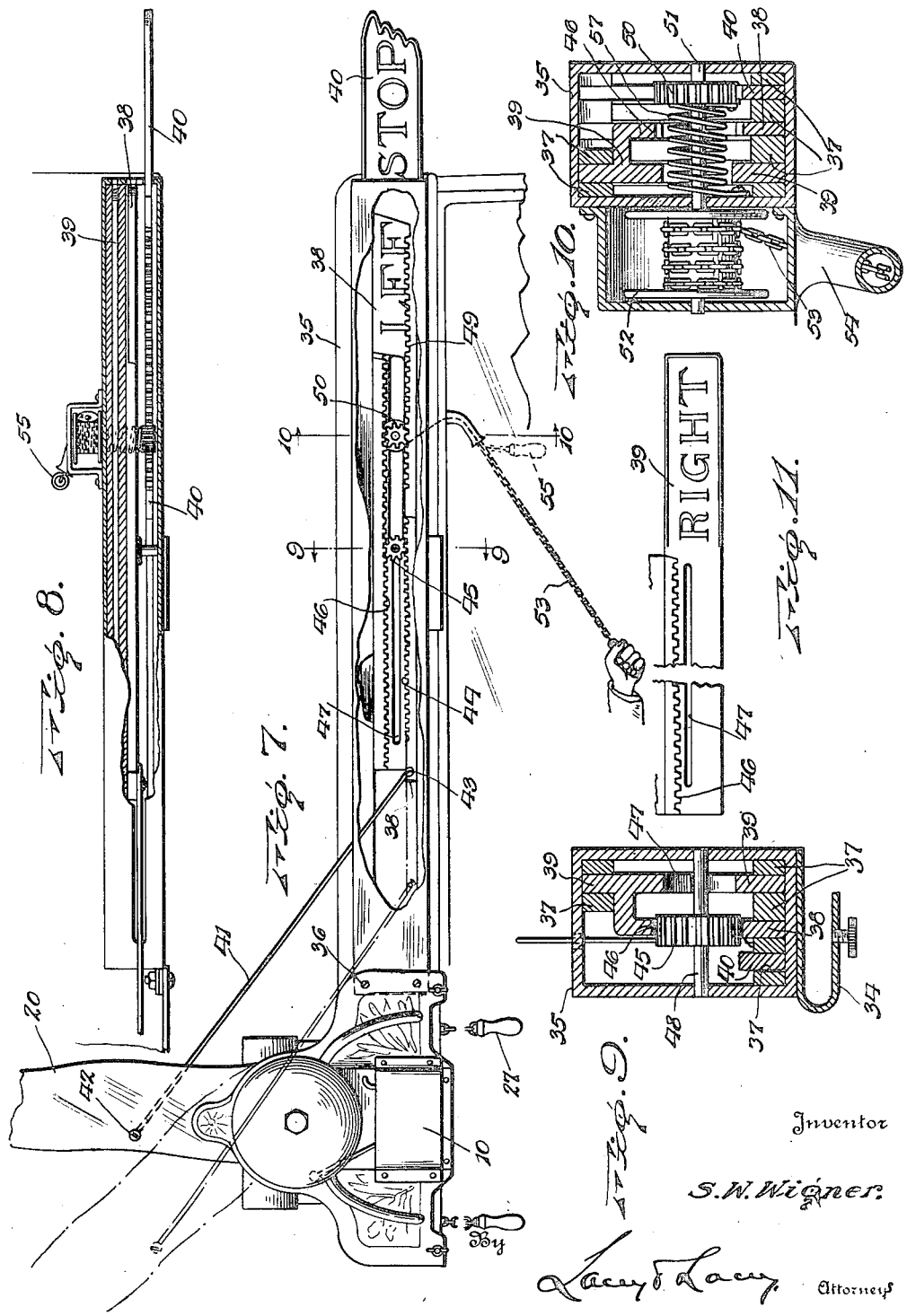

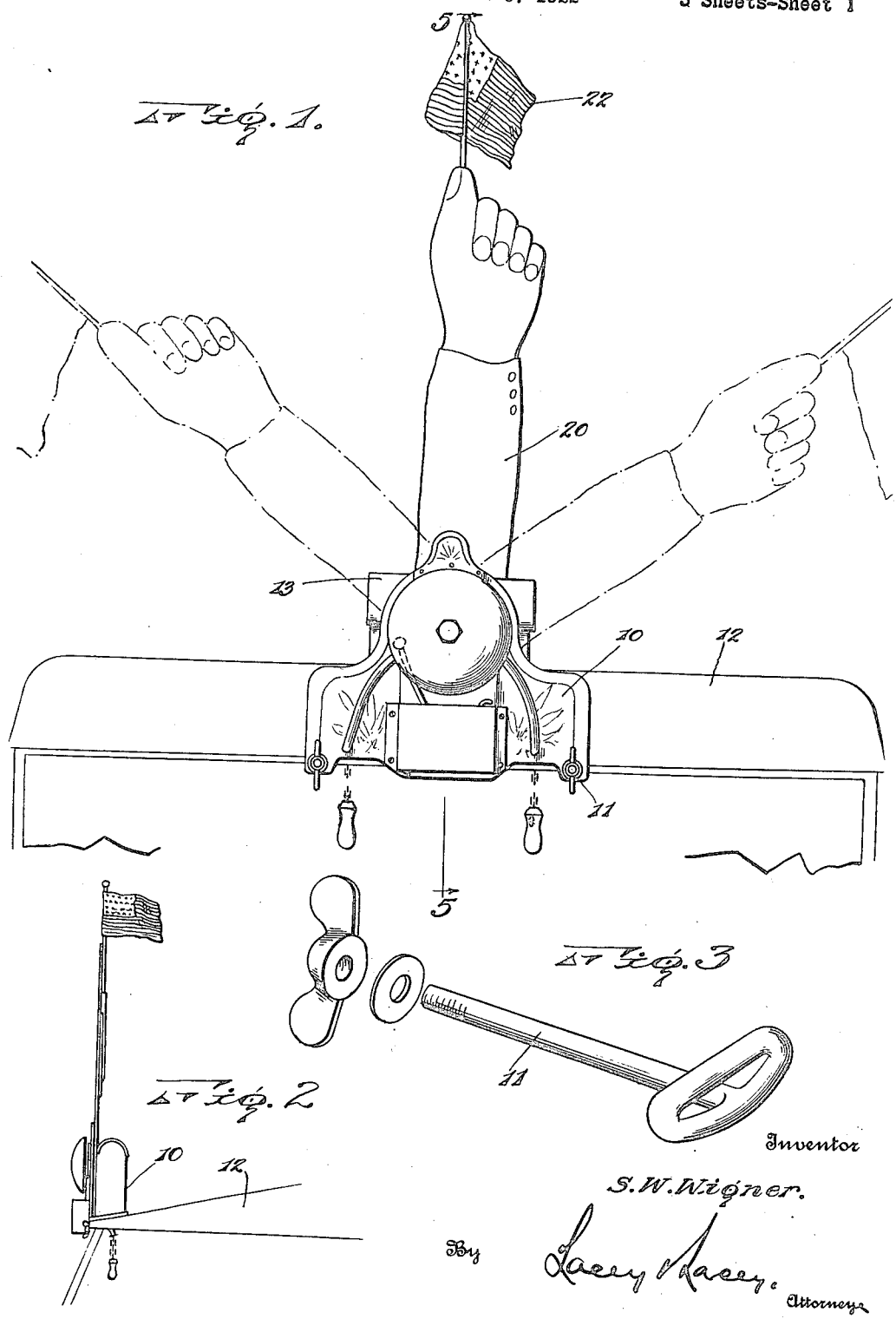

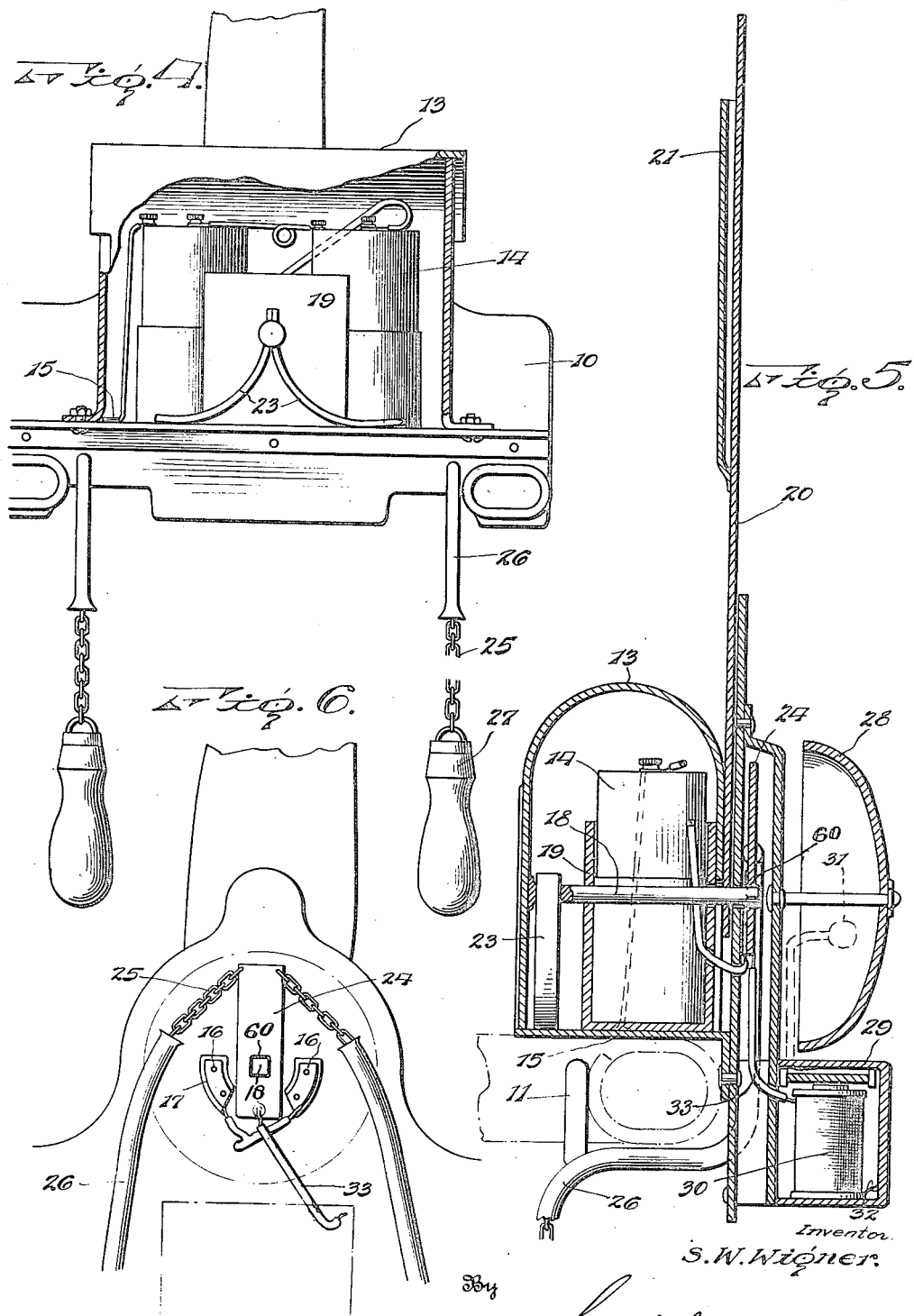

Patented Sept. 25, 1923.

1,468,684

UNITED STATES PATENT OFFICE.

SIRENAUS WELMAN WIGNER, OF PHOENIX, ARIZONA, ASSIGNOR OF ONE-SIXTH TO ELMER E. PASCOE, OF PHOENIX, ARIZONA.

SIGNAL FOR AUTOMOBILES.

Application filed February 6, 1922. Serial No. 534,613.

*To all whom it may concern:*

Be it known that I, SIRENAUS W. WIGNER, citizen of the United States, residing at Phoenix, in the county of Maricopa and State of Arizona, have invented certain new and useful Improvements in Signals for Automobiles, of which the following is a specification.

My invention relates to signals for vehicles in general and more particularly for automobiles.

The main object of the invention is to provide a signal of this character that may not only be readily seen but also will give audible warning in order to draw the attention of automobilists, drivers, or pedestrians, when a change in the direction of travel of the vehicle carrying the signal, is contemplated.

For this purpose I provide a housing attached centrally to the top of an automobile and a movable arm in the housing, which arm normally stands in upright position and a pair of handles to operate the arm and swing it to the right or to the left in accordance with the new direction the automobile is going to take; and I also provide a bell which is sounded when the arm moves.

In addition to this swinging arm and cooperating therewith, I also provide sliding signal arms marked "Right" and "Left" or colored to distinguish from each other. As the driver generally sits to the left in an automobile and for that reason uses his left arm to give a signal, when no mechanical device is provided for this purpose, I preferably arrange my sliding signal arms on the left side of the automobile, but there is no reason why it could not be placed on the right side thereof instead, or for that matter on both sides of the automobile. These sliding arms are so connected with the central arm, that the "left" signal will be exposed, when the central arm shows left and the "right" signal exposed, when the central arm shows right.

In the same housing I also arrange a "stop" signal, which however is independently operated to be exposed on the same side as the other sliding arms, so as to be best seen from the rear by a car traveling in the same direction.

In the accompanying drawings my invention is illustrated; and,

Figure 1 shows a front elevation of the invention in its simple form;

Figure 2 is a partial side view of a vehicle with the signal attached;

Figure 3 is a perspective view of a securing bolt of the device;

Figure 4 is a rear elevation in partial section of the device as illustrated in Figure 1;

Figure 5 is a vertical sectional view on the line 5—5 of Figure 1;

Figure 6 is a rear elevation of a portion of the interior of the device;

Figure 7 is a front elevation in partial section of the complete device carrying both swinging and sliding arms;

Figure 8 is a top plan view partly in section of Figure 7;

Figure 9 is a transverse section along line 9—9 of Figure 7;

Figure 10 is another transverse section along line 10—10 of Figure 7; and

Figure 11 is an elevation of one of the sliding signal arms.

The simple form of the device as illustrated in Figures 1 to 6 inclusive will now first be described.

The numeral 10 indicates a housing for the signal which, in the present case, is illustrated as attached by means of securing bolts 11 to the top 12 of an automobile. The housing is preferably positioned in the middle of the forward end of the top 12, as best seen in Figure 2. The housing is provided with a hood 13 which is removable and intended to cover a pair of dry battery cells 14, one pole of which is grounded as at 15 and the other pole having connection with contact pieces 16 placed with suitable insulations 17 on one wall of the housing.

A shaft 18 carried in suitable bearings 19 in the housing 10, has rigidly attached to it an arm 20 with a socket 21 at its extreme end intended to carry a flag 22. This arm, which normally stands in upright position, is held in this position by means of a pair of springs 23 which, at one end, engage with the shaft 18 while their extreme other ends rest on the bottom of the housing 10. In Figure 4 of the drawings, these springs have been shown as being made of flat steel, but it is evident that any other arrangement, such as coil springs, may be substituted for the same purpose.

At one end of the shaft 18 is rigidly secured a lever 24 to which is attached a pair of chains 25 guided in a pair of tubes 26 carried in the housing and extending below the same. The chains 25 protrude below the bell shaped ends of the tubes 26 and have suitable handles 27 attached to their lower ends. As will be seen from Figures 1 and 4, the handles and the tubes are so directed that the handles hang apart at each side of the central line of the device and may be ornamented or colored in different ways so as to distinguish one from the other.

On the front side of the housing is secured a bell 28 and below the same is a small casing 29 containing an electro-magnet 30 carrying a striker 31 for the bell. One end of the magnet coil is grounded as at 32 and the other end is connected with the lever 24 by means of a wire 33. The lever 24, which must be insulated as at 60 from the shaft 18, forms a switch with the contact plates 16 in the circuit of the batteries including the electro-magnet and the positions of the contacts 16 and lever 24 are such that the circuit is open when the arm 20 stands upright or in its normal position.

The operation of the device is as follows:

When the automobilist is contemplating turning to the right he pulls the right hand handle 27 which draws the chain 25 downward and swings the arm 20 to the right in horizontal or nearly horizontal position. In doing this, the lever 24, swinging in the same direction, passes over one of the contacts, which closes the circuit and excites the magnet 30 which thereupon sets the stricker 31 vibrating to sound the bell 28. In case a vehicle following the automobilist giving this signal should not at once observe the falling of the arm 20, the ringing of the bell would surely draw his attention to this signal. As soon as the operator ceases to pull on the handle 27, one of the springs 23 will turn the shaft 18 and thereby again raise the arm with the flag thereon into upright central position. To turn in a left hand direction, the operator would similarly pull the left hand handle, which then swings the arm 20 downward to the left, at the same time sounding the bell.

It is evident that instead of an electrically operated bell, a mechanical bell might be used, to be actuated by pulling on the handle and the swinging of the arm.

The device in its complete form is illustrated in Figures 7 to 11. As will be noted the central portion comprising the housing 10, arm 20, handles 27, etc., is also used in this case. Attached to one side of this housing 10 is a tubular casing 35 which is removably attached to the housing by means of bolts 36 or the like and with clips 34 to the top of the automobile. This casing, which reaches out to the side of the automobile top is provided with top and bottom guides 37 for three sliding arms 38, 39 and 40; 38 being marked "Left", 39 "Right", and preferably colored in some manner to distinguish from each other, and the third sliding arm is marked "Stop." Between the inner end of the "left" sliding arm 38 and the swinging arm 20 I provide a rod 41 which is pivoted to both of these arms as at 42 and 43 in such a manner, that when the swinging arm 20 is turned down to the left of the vehicle, which corresponds to the right in Figure 7, the sliding arm 38 will be pushed out of the casing 35 to be exposed on the left side of the vehicle, so that the word "left" can be read by the occupant of a vehicle following in the rear of the one carrying the signal. Similarly when the arm is swung in the opposite direction, the arm 38 will be drawn inwardly a similar amount, that is to say, the arm slides inwardly toward the housing 10. The sliding arm 38 carries an upwardly directed tooth rack 44 which engages a pinion 45 mounted to revolve in the casing and the "right" sliding arm 39 carries a corresponding downwardly directed tooth rack 46 also engaging pinion 45. A slot 47 is provided in the sliding arm 39, through which the spindle 48 carrying the pinion 45 protrudes, so as to permit the free sliding in and out of the arm 39 and the spindle 48 is carried in the outer walls of the casing as best seen in Figure 9. It will now be evident that, when the arm 38 is pushed outward by the swinging arm 20 to expose its signal left, the other arm 39 will slide a corresponding amount inwardly actuated by the two racks 44, 46 and the pinion 45 and that similarly, when the sliding arm 38 is drawn inwardly, the arm 39 will slide outwardly and expose its signal "right" beyond the end of the casing 35, and it should here be remarked that both of these arms 38 and 39, as well as the "stop" arm 40, are all concealed in the casing under normal conditions, that is when they are not operated.

The third sliding arm 40 also has a toothed rack 49 which meshes with the second pinion 50 carried on a spindle 51, see Figure 10, also supported to revolve in the casing 35. At one end of the spindle 51 I provide a reel 52 upon which a chain 53 is wound. This chain is guided in a short tube 54 opening to the inside of the vehicle and the chain terminates with a small handle 55 for the operator. Normally the sliding arm 40 is housed in the casing 45 and held in this position by a coil spring 57, which at one end is secured to the pinion 50 and at the other end held rigidly in the housing 35. When the handle 55 is released, the spring 57 will draw the sliding arm 40 inwardly and wind up the chain on the reel 52.

Having thus described the invention, what is claimed as new is:

1. A signal for vehicles comprising a housing having a side extension, a lever pivoted therein, means for normally holding the lever in central position and other means for swinging the lever out of said position; a signal arm slidably mounted in said side extension of the housing, a connecting element between said lever and said arm, whereby, upon said lever being operated, said signal arm will be simultaneously displaced in the housing.

2. A signal for vehicles comprising a housing having a side extension, a lever pivoted therein, means for normally holding the lever in central position and other means for swinging the lever out of said position; a signal arm slidably mounted in said side extension of the housing, a connecting element between said lever and said arm, a second signal arm similarly guided in the housing, and gearing between said arms, whereby, upon said lever being operated, said signal arms will be simultaneously displaced in opposite directions, thereby exposing one and concealing the other.

3. A signal for vehicles comprising a housing, a pair of signal arms slidably mounted therein, elements interposed between said arms tending to move the arms in opposite directions, a pivoted member connected with one of said arms, means for holding said member in inoperative position and other means counteracting said first means for operating said member to displace the signal arms and expose one of them.

4. A signal for vehicles comprising a housing, a pair of signal arms slidably mounted therein, elements interposed between said arms tending to move the arms in opposite directions, a pivoted member connected with one of said arms, a spring adapted to hold said member in inoperative position, thereby concealing both signal arms, and tensioning elements attached to said member and adapted to turn the latter in opposite directions, thereby exposing one of the signal arms.

5. A signal for vehicles comprising a housing, a signal arm slidably mounted therein, a pivoted member connected with said arm, a second signal arm also slidably mounted in the housing and gearing between said arms; a spring adapted to hold said member in inactive position, thereby keeping both arms concealed, and a tensioning element connected with said member and adapted to revolve the member, thereby displacing said arms in opposite directions and exposing one of them.

6. In a signal device having a housing with a side extension, an alarm system, a pair of arms slidably mounted in said extension and marked to give different signals, means for holding the arm in inactive position and other means for actuating said alarm system and displacing the arm out of said position to give a visible signal.

In testimony whereof I affix my signature.

SIRENAUS WELMAN WIGNER. [L. S.]